United States Patent
Haenlein (10) Patent No.: US 7,032,272 B2
(45) Date of Patent: Apr. 25, 2006

(54) FRICTION HINGE

(75) Inventor: Hans-Christoph Haenlein, Cupertino, CA (US)

(73) Assignee: Masco Corporation of Indiana, Indianapolis, IN (US)

( * ) Notice: Subject to any disclaimer, the term of this patent is extended or adjusted under 35 U.S.C. 154(b) by 129 days.

(21) Appl. No.: 10/400,300

(22) Filed: Mar. 27, 2003

(65) Prior Publication Data

US 2004/0187261 A1 Sep. 30, 2004

(51) Int. Cl.
*E05D 3/06* (2006.01)

(52) U.S. Cl. .............. 16/366; 16/224; 16/266; 403/122; 137/508

(58) Field of Classification Search ............ 16/366, 16/379, 368, 370, 224, 233, 260, 265, 266, 16/276; 403/122, 134, 135, 137, 142; 137/508–512, 137/606, 625.66
See application file for complete search history.

(56) References Cited

U.S. PATENT DOCUMENTS

| | | | | |
|---|---|---|---|---|
| 2,126,443 A | * | 8/1938 | Begley | 482/117 |
| 2,200,283 A | * | 5/1940 | Lennon | 89/37.03 |
| 2,849,548 A | | 8/1958 | Young | 200/6 |
| 3,056,867 A | | 10/1962 | Eitel | 200/81 |
| 3,072,426 A | * | 1/1963 | Gilbert | 403/115 |
| 3,589,242 A | | 6/1971 | Peterson et al. | 91/413 |
| 3,667,503 A | | 6/1972 | Farrell et al. | 137/625.4 |
| 3,680,592 A | | 8/1972 | Hayman | 137/625.4 |
| 3,698,415 A | | 10/1972 | Forster et al. | 137/102 |
| 3,766,944 A | | 10/1973 | Distler | 137/625.6 |
| 3,952,764 A | | 4/1976 | Keller, III | 137/119 |
| 3,958,601 A | | 5/1976 | Schmitt | 137/636.2 |
| 3,965,935 A | | 6/1976 | Morisseau | 137/625.4 |
| 4,084,611 A | | 4/1978 | Mahrer | 137/454.2 |
| 4,162,386 A | * | 7/1979 | Bourgeois et al. | 200/339 |
| 4,183,377 A | | 1/1980 | Bernat | 137/625.17 |
| 4,200,123 A | | 4/1980 | Brandelli | 137/625.4 |
| 4,301,830 A | | 11/1981 | Keller, III | 137/454.6 |
| 4,337,795 A | | 7/1982 | Argyris et al. | 137/625.17 |
| 4,586,534 A | | 5/1986 | McNeely | 137/515.7 |
| 4,604,502 A | | 8/1986 | Thomas | 200/6 A |
| 4,605,200 A | | 8/1986 | Huppee | 251/258 |
| 4,633,906 A | | 1/1987 | Tuchman | 137/625.17 |
| 4,739,523 A | | 4/1988 | Bondar | 4/191 |
| 4,754,783 A | | 7/1988 | Knapp | 137/625.4 |
| 4,768,552 A | | 9/1988 | Stella | 137/625.4 |

(Continued)

FOREIGN PATENT DOCUMENTS

| | | | |
|---|---|---|---|
| DE | 3632265 C1 | * | 4/1988 |
| EP | 0 311 546 A2 | | 4/1989 |
| EP | 0 855 544 A2 | | 7/1998 |
| GB | 579542 | | 8/1946 |
| WO | WO 03/060621 A1 | | 7/2003 |

*Primary Examiner*—Robert J. Sandy
*Assistant Examiner*—Andre' L. Jackson
(74) *Attorney, Agent, or Firm*—Woodard, Emhardt, Moriarty, McNett & Henry LLP (57) ABSTRACT

A motion control device for controlling the movement of an operational member about a first axis and about a second axis includes a spindle having a socket and a control arm wherein the socket defines a first axis opening. The device includes a cylindrical pivot member inserted into the first axis opening concentric with the first axis. The pivot member defines a second axis opening and the device includes a cylindrical pivot pin inserted into the second axis opening concentric with the second axis. The spindle is designed to pivot in a first direction about the first axis and in a second direction about the second axis wherein the first and second axes are orthogonal to each other. In one embodiment, a hexagonal drag spring is inserted between the pivot member and spindle to influence the frictional drag for one of the two directions of movement.

19 Claims, 9 Drawing Sheets

U.S. PATENT DOCUMENTS

| | | | |
|---|---|---|---|
| 4,768,557 A | 9/1988 | Holzer | 137/636.2 |
| 4,782,853 A | 11/1988 | Moen | 137/454.6 |
| 4,854,347 A | 8/1989 | Knapp | 137/625.4 |
| 4,854,498 A | 8/1989 | Stayton | 236/12.12 |
| 4,887,642 A * | 12/1989 | Bernat | 137/625.41 |
| 4,932,433 A | 6/1990 | Knapp | 137/381 |
| 4,957,135 A | 9/1990 | Knapp | 137/454.6 |
| 5,095,934 A * | 3/1992 | Iqbal | 137/270 |
| 5,100,565 A | 3/1992 | Fujiwara et al. | 251/368 |
| 5,170,816 A | 12/1992 | Schnieders | 137/556.6 |
| 5,204,507 A | 4/1993 | Saeda et al. | 219/121.82 |
| 5,293,900 A | 3/1994 | Karbassi et al. | 13/554 |
| 5,295,513 A | 3/1994 | Hori | 137/636.2 |
| 5,342,018 A | 8/1994 | Wu | 251/250 |
| 5,486,174 A * | 1/1996 | Fournet-Fayard et al. | 606/61 |
| 5,542,449 A | 8/1996 | Huang | 137/551 |
| 5,559,432 A | 9/1996 | Logue | 324/207.17 |
| 5,592,971 A | 1/1997 | Knapp | 137/625.41 |
| 5,692,541 A | 12/1997 | Brown | 137/636.2 |
| 5,743,297 A | 4/1998 | Mueller | 137/636.2 |
| 5,810,050 A | 9/1998 | Pickerrell et al. | 137/625.41 |
| 5,896,601 A | 4/1999 | Humpert et al. | 4/677 |
| 5,937,897 A | 8/1999 | Chatterjea et al. | 137/554 |
| 6,045,118 A | 4/2000 | Knapp | 251/231 |
| 6,050,285 A | 4/2000 | Goncze et al. | 137/98 |
| 6,131,600 A | 10/2000 | Change | 137/100 |
| 6,179,130 B1 | 1/2001 | Nguyen et al. | 210/424 |
| 6,183,636 B1 | 2/2001 | Bowers et al. | 210/232 |
| 6,271,828 B1 | 8/2001 | Rosenberg et al. | 345/156 |
| 6,298,875 B1 | 10/2001 | Warshawski et al. | 137/606 |
| 6,300,937 B1 | 10/2001 | Rosenberg | 345/156 |
| 6,325,089 B1 | 12/2001 | Breda | 137/98 |
| 6,339,979 B1 * | 1/2002 | Chiang | 81/177.2 |
| 6,394,133 B1 | 5/2002 | Knapp | 137/615 |
| 6,409,413 B1 * | 6/2002 | Bieg et al. | 403/115 |
| 6,429,849 B1 | 8/2002 | An et al. | 345/161 |

* cited by examiner

FRICTION HINGE

BACKGROUND OF THE INVENTION

The present invention relates in general to a motion control device in the form of a friction hinge having two degrees of freedom. More specifically, the present invention relates to a gimbal mechanism in which the two degrees of freedom are about two orthogonal axes. One of the features of the present invention is the incorporation of a drag friction component in order to create a "non-symmetrical" gimbal behavior. In one embodiment of the present invention, the drag friction component is provided by a pair of hexagonal spring sleeves.

While the present invention has broad application in a variety of fields for a variety of different devices, one embodiment of the present invention is described in the context of a fluid control valve. Other devices and applications for the friction hinge of the present invention include mechanical connections such as swivel joints where wobble might be a concern. For example, the present invention would have applicability as part of a device where there is movement of one portion relative to another, typically stationary, portion and a desire to add a frictional force that exceeds the gravitational force. In this way, the added friction that has to be overcome to initiate movement is designed to prevent wobble of the movable portion.

Considering the use of the present friction hinge invention in the context of a fluid control valve, it will be noted that single-handled water faucet control valves have been offered with different mechanical arrangements for controlling the available directions of travel, the range of motion and the type or style of motion for the handle. One style of control valve of the type being described includes a handle that is moved in a generally sideways (left-to-right and right-to-left) direction in order to adjust the mix of hot and cold water for the desired temperature. With this style of water faucet control valve arrangement, the handle is typically moved in an upward or forward direction, away from the user, to increase the flow rate and volume. The handle is typically moved in a downward or rearward direction, toward the user, in order to reduce the flow rate and volume or to completely shut off the flow of water out of the controlled faucet.

Single-handled control valves of the type described above can be referred to as having a joy stick control handle due to the single-handle construction and the manner in which the handle can be moved. The directions and range of motions are controlled by the internal structure of the valve mechanism and by the selection and arrangement of the component parts. Some of these referenced component parts include the component parts of the friction hinge according to the present invention. Single-handled water faucet control valves that are known to exist are typically constructed with consideration given to the type of fluid to be delivered, the end use, the end user, and the circumstances that exist when the valve is actuated or opened relative to the convenience and safety of the user.

In the field of water delivery faucets, one style of single-handled control valve (referred to herein as "type one", for reference only) is configured such that there is sliding motion in a first direction and rotary motion in a second direction. With a type one style of control valve, the selected water temperature is able to be maintained as the water flow is adjusted or turned off. This is possible because the first direction of motion is "decoupled" from the second direction of motion.

Another style of single-handled control valve (referred to herein as "type two", for reference only) is configured such that the motion in a first direction and the motion in a second direction are not decoupled. This means that movement of the handle in a direction that is a vector product of the two primary directions is possible. In one specific configuration of a type two control valve, the handle returns to the center or neutral temperature position when the water flow is turned off. One embodiment of a type two style utilizes a modified ball and socket combination with a pin and slot feature to control the "return to neutral" characteristic as described above. Some of the branded DELTA® faucets, offered by Delta Faucet Company of Indiana, are designed in this manner.

The type one style involves movement of the handle in two different directions that are distinct from each other. As used herein, the term "distinct" is intended to define a control valve motion wherein movement of the handle in one direction to control or adjust one of the two water variables does not have an effect on the other water variable, and vice versa. More specifically, control valves of this style include a structure that enables rotary motion in one direction for controlling one water parameter and sliding motion in a second direction for controlling a second water parameter. Control valves of this type incorporate a front-to-back (or a back-to-front) tilting or sliding action for the ON-OFF control and rotation about a control axis for the HOT-COLD adjustment. The referenced "control" axis may be a vertical axis in certain faucet designs, and/or the Z axis depending on the faucet design, and/or the longitudinal axis of the valve body or handle. The mechanisms or arrangements that are selected for fluid control in this type or style of control valve inherently have high frictional interfaces and an effort is made in the nature of design modifications to try and reduce those frictional forces so that the control lever is able to move more easily.

There are aspects of fluid control valves that include the type one style of motion that can be improved upon. For example, the structure of this style and the mechanisms used to effect motion in the first and second directions make it progressively harder to manipulate flow temperature as the control valve approaches its full ON position. This is true due to the fact that the moment arm of the lever around the flow control axis typically decreases when the flow lever is in the ON position. It is also typically harder to control the flow rate as the temperature approaches either of the extreme positions (full hot or full cold) since the lever has usually rotated around to a less favorable position at these extremes as compared to the more optimized warm position. One benefit, however, of the type one style of motion is that this arrangement provides for a desirable decoupling of control motions for the two water flow variables, namely the water flow rate and the water temperature. These two variables can be easily controlled independently of one another by this type one style of motion.

When a fluid control valve is used for the delivery and control of water for a residential user, user convenience and safety are important. With the type one style of control valve, when the handle is moved to an "off" position, but with the water temperature position remaining elevated, the user can initially receive water at a higher temperature than desired. The type two style avoids the initial delivery of higher temperature water by returning the control lever to a temperature-neutral position when the flow of water is turned off. However, the type two style introduces a new consideration. Due to the freedom of movement of the fluid control valve and the different directions of travel, one for adjusting the water temperature and the other for adjusting the flow rate (volume), the user needs to carefully position the handle for the desired balance of both water temperature and water flow rate. For example, after the selected balance of temperature and flow rate is reached and thereafter an increased flow rate is desired, care must be taken to avoid changing the temperature as the handle is moved in order to adjust the fluid flow rate. A similar consideration exists once the desired flow rate is set and then the water temperature needs to be adjusted. While the freedom of handle movement does not present a safety concern, some potential purchasers of water faucets of this general type may prefer to be able to adjust one water parameter, temperature or flow rate, without unintentionally changing the other water parameter.

One reality of the type two style that includes a modified ball and socket is that with the ball at rest, there is static friction that influences the initial force that is required to "break" the ball free and initiate movement. Once the ball is in motion, the user feels the effect of dynamic friction and the dynamic friction is less than the static friction that had to be overcome to initiate movement. Since the type two style does not decouple the motion or travel in a first direction from the motion or travel in a second direction, once the static friction on the ball is overcome, it is difficult for the user to feel any difference in the two directions of motion or in a combination of those two directions, such as the vector product. Even if the user has selected one direction as his "preferred" direction of movement, it is difficult to sense or feel if there is any departure from the chosen path. Since the directions of motion or travel are not decoupled, breaking the ball free to initiate movement in one direction also breaks the ball free in the other direction.

After reviewing existing motion control mechanisms generally and those types used for fluid control valves, the features of interest or importance to consumers and the available products, the present inventors concluded that it would be an improvement to such motion control mechanisms if an improved friction hinge could be designed. One application for such an improved friction hinge would be in cooperation with a fluid control valve. The present inventors also envisioned that it would be an improvement to fluid control technology if the benefits and advantages of single-handle controlled motion could be combined with the decoupled control of the two water flow variables, temperature and flow rate, similar to the type one style of motion. The present inventors further envisioned that, by using the improved friction hinge, the structural configuration of the fluid control valve mechanism would have two decoupled directions of handle movement about two intersecting orthogonal axes and that the frictional force in one direction of handle travel would be different from the frictional force in the other direction of handle travel.

The present inventors envisioned that by selecting a modified ball and socket configuration, the realities of static friction versus dynamic friction could be utilized. With decoupled directions of travel, once the user selects the "preferred" direction of travel and initiates motion, the static friction is overcome and changes to the lower dynamic friction. This does not affect the other direction of travel which remains in a static friction state. The result, due to the lower frictional level, is that the control handle is easier to move in the selected (i.e., preferred) direction. The control valve prefers this direction as well since there is less friction. Whichever one of the two decoupled directions of travel is initially selected by the user, this is the direction that will provide a sense or feel to the user of a lower dynamic frictional force or frictional level. This then becomes the frictional drag that is sensed in order to continue with the selected direction of travel. Accordingly, it will be easier to continue moving the control handle in that preferred direction as compared to changing to the other direction. Any change to the other direction would then have to overcome the higher static friction in order to initiate movement.

The present inventors also considered as part of the friction hinge design the possibility of selectively increasing the friction for one direction of travel so that the other direction would be preferred, regardless of the static friction versus dynamic friction difference. For example, if it is preferred for the adjustment of the water flow rate to be easier, i.e., a lower frictional force, than the adjustment of the water temperature, i.e., a higher frictional force, then a fluid control valve could be designed as one application for the friction hinge of the present invention. If this described situation is preferred, then the frictional drag that is added to the water temperature direction must be greater than the static/dynamic difference. In this way, even if the water temperature direction is selected and the lower dynamic friction is encountered, the added frictional drag will exceed this difference such that the water flow rate direction is still preferred. It was also envisioned by the present inventors that whatever mechanism would be used to vary the frictional force between the two directions of motion, that the frictional force level could be adjusted so that it could be specifically configured to each particular faucet and control valve configuration.

From the evaluation of existing technology by the present inventors, they conceived of the present invention as a novel an unobvious improvement to the current state of the art in the field of motion control devices. Specifically, the present invention utilizes a structural configuration with two separate orthogonal axes passing through a point with decoupled control of the movement about each axis. As an option, the frictional force about a selected axis can be selectively adjusted. What results is a friction hinge for a type one style, joy stick motion, based on a modified ball and socket configuration, that includes temperature memory and a higher frictional force in the direction of water temperature adjustment in order to "prefer" motion in the direction of flow rate or volume adjustment. While there are various applications for the friction hinge of the present invention, the selected application in the context of a fluid control valve provides a practical example of everyday use.

While the present invention is described in the context of the preferred embodiment, it is to be noted that the applicable scope of the present invention is broader.

SUMMARY OF THE INVENTION

A motion control device for controlling the movement of an operational member about a first axis and about a second axis according to one embodiment of the present invention comprises a spindle including a socket and a control arm, the socket defining a first axis opening, a pivot member inserted into the first axis opening such that the pivot member is concentric with the first axis, the pivot member defining a second axis opening and a pivot pin inserted into the second axis opening such that the pivot pin is concentric with the second axis, wherein the spindle is constructed and arranged to pivot in a first direction about the first axis and in a second direction about the second axis.

One object of the present invention is to provide an improved motion control device.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 9:
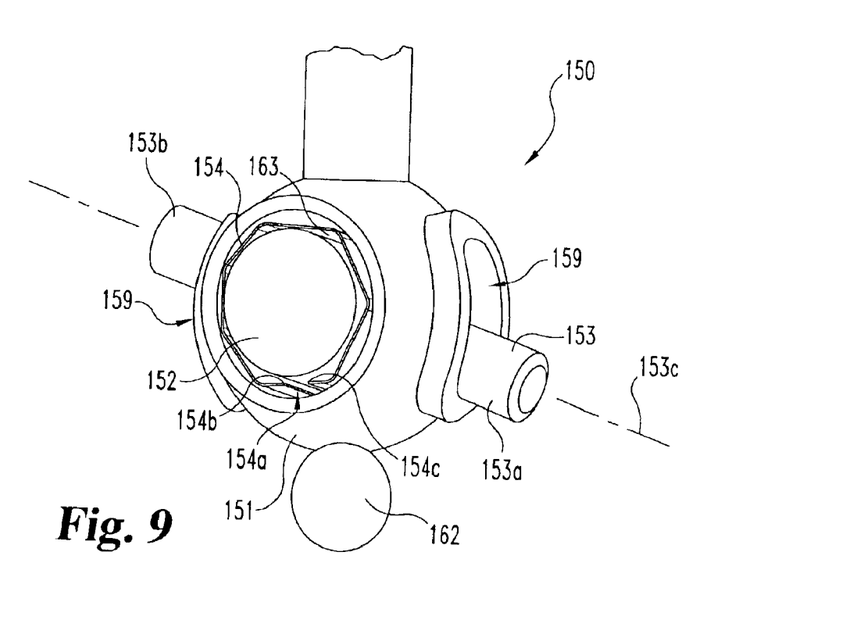
FIG. 9 is a perspective view of a friction hinge subassembly according to the present invention.
Figure 10:
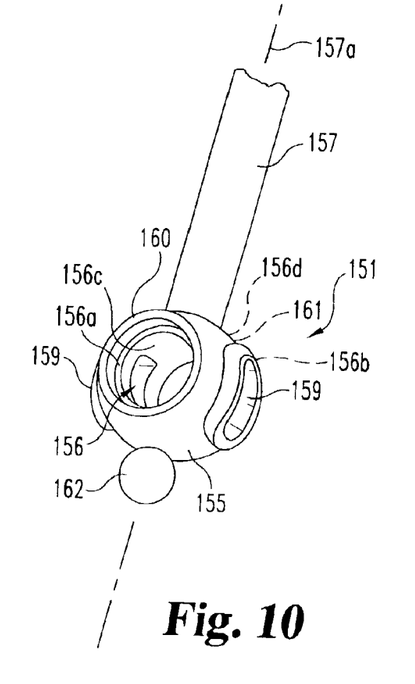
FIG. 10 is a perspective view of a spindle comprising one component of the FIG. 9 friction hinge subassembly.
Figure 11:
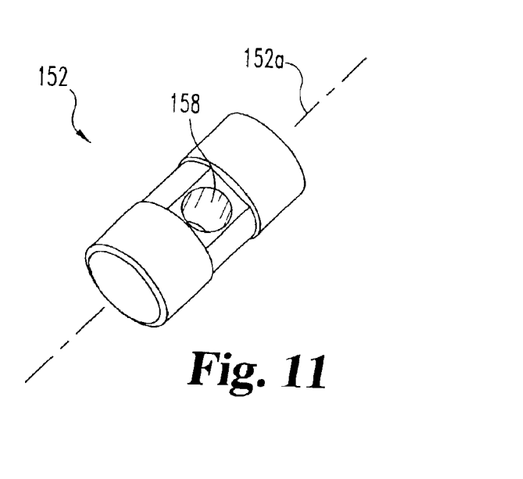
FIG. 11 is a perspective view of a pivot member comprising another component of the FIG. 9 friction hinge subassembly.

Referring to FIGS. 1–5, there is illustrated a fluid control valve 20 including a motion control device according to the present invention. The specific construction of the motion control device, according to the present invention, is a friction hinge subassembly. One embodiment of the referenced friction hinge subassembly is illustrated in FIGS. 3–8. Another embodiment is illustrated in FIGS. 9–11.

With continued reference to FIGS. 1–5, valve 20 includes as some of its primary structural component parts body 21, housing 22, and bonnet nut 23. These component parts are additionally illustrated in FIGS. 7 and 8. As illustrated, and as would be understood from a careful review of the specific structural features, a lower portion of housing 22 fits down into the hollow interior 24 of body 21 and an upper portion of housing 22 extends upwardly, above and free of body sidewall 25. The unitary body 21 includes an externally-threaded annular collar 26 and the internally-threaded annular skirt 27 of unitary bonnet nut 23 threadedly attaches to collar 26. This threaded engagement captures the radial flange 30 of housing 22 between body 21 and bonnet nut 23. In order to properly orient housing 22 within body 21 and to prevent any relative rotation or turning between the body 21 and the housing 22, a relief notch 31 is formed in collar 26 and a cooperating key tab 32 is formed as part of the radial flange 30.

The combination of the housing 22 and body 21 defines an interior space 33 that receives the remaining component parts that comprise valve 20. These remaining component parts constitute the primary component parts of the flow control mechanism utilized as part of fluid control valve 20. The only portions of the disclosed structure extending outside of interior space 33 are the control lever portion 34 of unitary spindle 35 and the ends of pivot pin 36. The interior components that comprise the remainder of valve 20, in addition to spindle 35 and pivot pin 36, include an inlet gasket 40, lower housing 41, lower disk seal 42, lower disk 43, upper disk 44, upper disk seal 45, upper disk support 46, pivot 47, drag spring 48, and washer plate 49. These components and the sequential axial stack of these components are further illustrated in the exploded views of FIGS. 7 and 8.

As will be described in greater detail, spindle 35, pivot 47, and pivot pin 36 are assembled together into a first embodiment of the friction hinge subassembly according to the present invention and this subassembly functions as a motion control device. While drag spring 48 is included as part of the preferred embodiment, this is an optional component depending on the amount or level of frictional drag that is desired for one of the directions of motion for spindle 35. The second embodiment of the friction hinge subassembly, see FIGS. 9–11, uses a pair of drag springs.

It will also be understood from the following description that the lower housing 41 and inlet gasket 40 are fixed in position relative to valve body 21 and in effect comprise a valve body assembly. Similarly, the combination of the bonnet nut 23 and housing 22, that are also fixed in position relative to body 21, can be thought of in terms of comprising a housing assembly, notwithstanding that housing 22 is assembled with the remaining components that are installed in body 21, as a subassembly, prior to bonnet nut 23 being threaded into position about collar 26. While the preferred embodiment of the present invention contemplates arranging the remaining components as a type of snap-together subassembly, at least one alternative is envisioned. This alternative is to assemble the referenced remaining components as a stack of individual parts that are not subassembled. If this alternative design is selected, then body 21 could be replaced by a faucet base or faucet housing with the required fluid openings or passageways. In this alternative design, inlet gasket 40 and lower housing 41 are not required.

Lower housing 41 defines three openings 41a, 41b, and 41c that are axially aligned with the three openings 43a, 43b, and 43c defined by lower disk 43. In order to seal around openings 41a–41c at the surface-to-surface interface between lower housing 41 and body 21, inlet gasket 40 is provided. In order to seal around openings 43a–43c at the surface-to-surface interface between lower disk 43 and upper disk 44, lower disk seal 42 is provided. For design simplicity and efficiency, the inlet gasket 40 is a unitary component, even though three separate gasket O-rings are used for the three openings 41a–41c. Similarly, for design simplicity and efficiency, the lower disk seal 42 is a unitary component, even though three separate gasket O-rings are used for the three openings 41a–41c and for the three openings 43a–43c. As will be described in greater detail hereinafter, the movement of upper disk 44 across the surface of lower disk 43 controls both flow rate and water temperature. The upper disk 44 includes an interior opening that is positionable over openings 43a–43c in order to effect this control.

Body 21 includes an annular sidewall 25 extending between base 54 and collar 26. Base 54 defines a pair of post recesses 55 and 56 and three flow openings. Flow openings 21a and 21b are illustrated, the third opening is not illustrated. However, the pattern and spacing of the three base openings coincide with the pattern and spacing of openings 41a–41c and of openings 43a–43c. Lower housing 41 includes a pair of upright arms 57 and 58 positioned on opposite sides of lower housing 41. Extending axially downwardly from the lower surface 59 of lower housing 41 is a pair of oppositely disposed posts 60 and 61. Posts 60 and 61 are constructed and arranged to fit into post recesses 55 and 56 as part of the assembly of lower housing 41 into body 21. Alignment and positioning of posts 60 and 61 into post recesses 55 and 56 properly positions and fixes lower housing 41 into body 21. As will be explained, upright arms 57 and 58 are constructed and arranged to snap into openings 100 of housing 22. If the alternative (non-subassembly) design is selected, then the arms 57 and 58 and the openings 100 would not be used and should be eliminated.

Lower housing 41 includes a sidewall 65 that defines a receiving recess 66 and a radially inwardly directed keying tab 67. The uniquely shaped periphery of recess 66 is substantially the same as the peripheral shape of lower disk 43. Lower disk 43 also defines a tab recess 68 that is constructed and arranged to receive keying tab 67 when the lower disk 43 is assembled down into recess 66 of lower housing 41. As described, lower housing 41 is fixed in position relative to body 21. Similarly, lower disk 43 is fixed in position relative to lower housing 41. As for the inlet gasket 40 (a unitary set of three elastomeric O-rings), this is fixed radially relative to the lower housing 41 by means of three annular O-ring grooves defined by the lower surface 59 of lower housing 41. Portions of grooves 71a and 71b are illustrated in FIG. 8. The upper surface 72 of recess 66 defines three annular O-ring grooves 73a–73c for receipt of lower disk seal 42 (a unitary set of three elastomeric O-rings). The receipt of lower disk seal 42 in this manner ensures that the lower disk seal 42 is fixed radially relative to lower housing 41 and relative to lower disk 43 (see FIG. 8).

As would be recognized from a general understanding of single-lever control valves used for residential water faucets, for example, one incoming conduit or line is for the delivery of hot water, another incoming line is the delivery of cold water, and a third line is for the outflow of water, whether hot, cold or a blended mixture. These three lines correspond to the three openings 41a–41c in lower housing 41, the three flow openings in body 21 (21a and 21b being the only ones illustrated), and the three openings 43a–43c in lower disk 43.

In order to be able to control the flow rate and the temperature of the water flowing from the faucet or outlet that is controlled by fluid control valve 20, it is necessary to be able to vary the lateral or cross sectional flow area of the various openings 43a–43c from open to fully closed. This function is performed by the shape and positioning of the movable components of the fluid control valve 20, specifically the manner in which upper disk 44 slides across the upper surface of lower disk 43, aligning the interior opening of upper disk 44 with one, both, or neither of openings 43a and 43b while aligning the interior opening with a portion of opening 43c.

Figure 7:
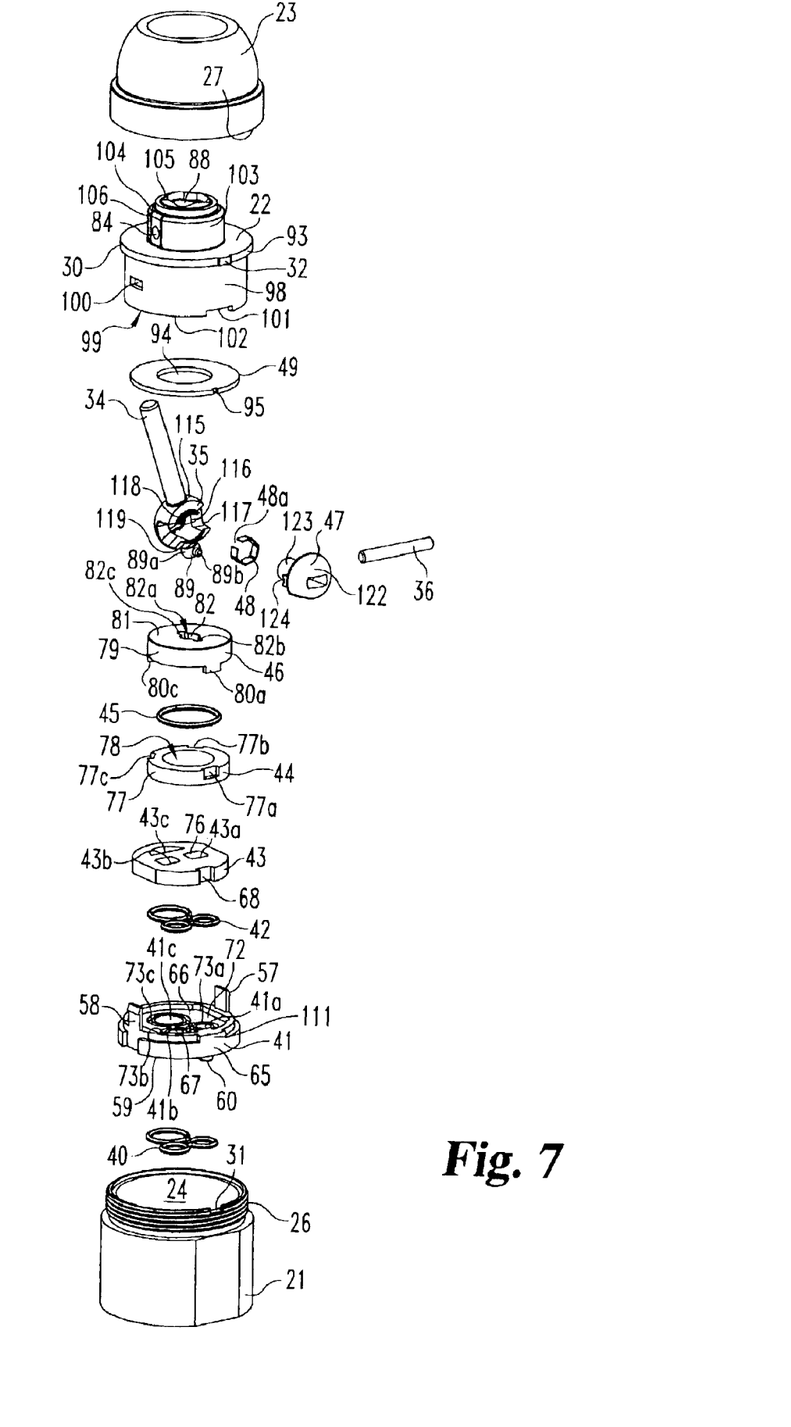
FIG. 7 is an exploded view in partial section of the component parts comprising the FIG. 1 fluid control valve according to the present invention.
Figure 8:
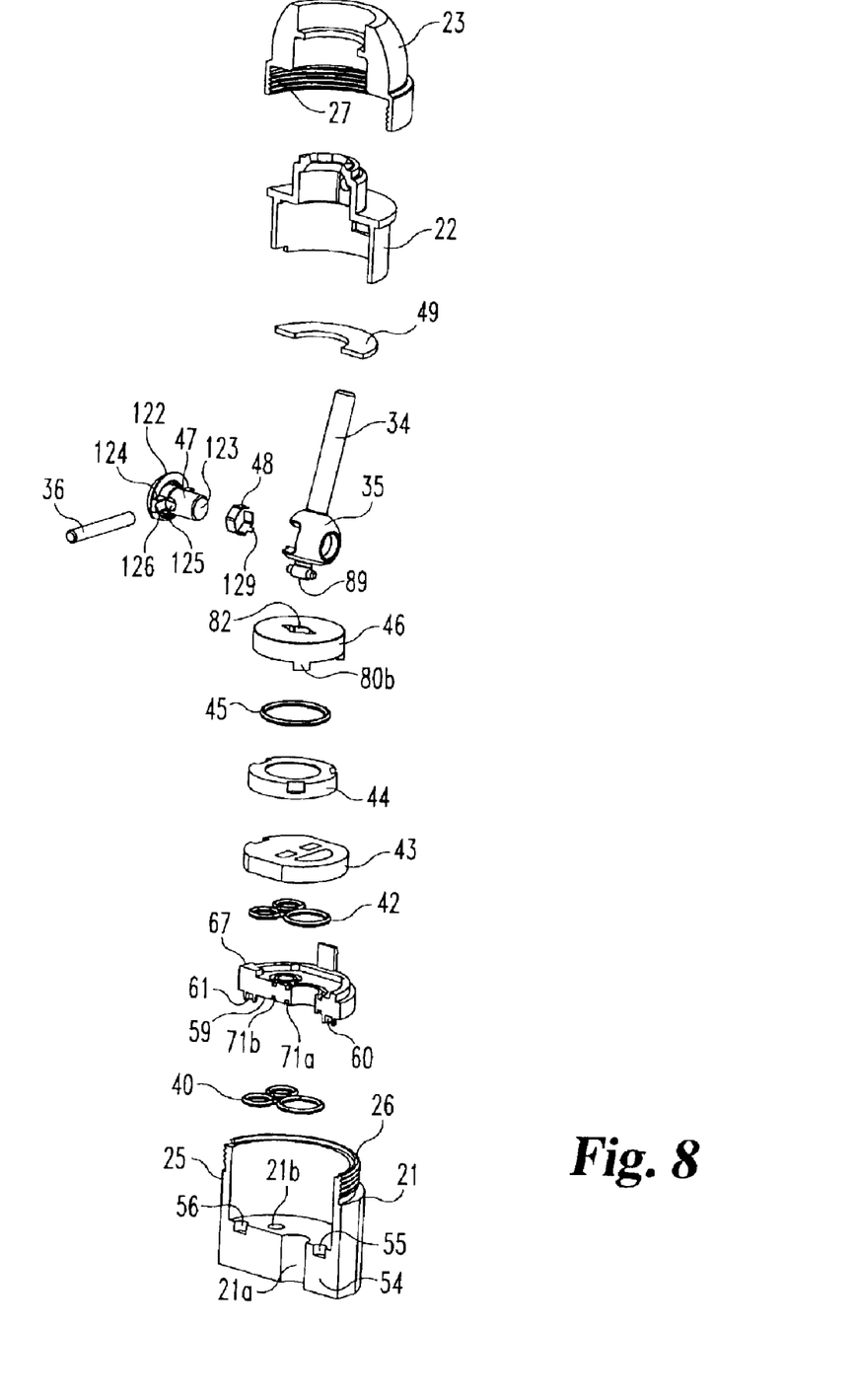
FIG. 8 is an exploded view in partial section of the component parts comprising the FIG. 1 fluid control valve according to the present invention.

With continued reference to FIGS. 7 and 8, upper disk 44 is a unitary, movable component that is constructed and arranged to move by sliding across the upper surface 76 of lower disk 43. The annular sidewall 77 defines a pattern of three relief notches 77a–77c, equally-spaced around the periphery of sidewall 77, and an interior region 78 that is uniquely contoured for flow management and control. The annular upper disk seal 45 (O-ring shape) is positioned between upper disk support 46 and upper disk 44 and is received with an O-ring groove defined by the upper disk support 46.

Upper disk support 46 includes a sidewall 79 that defines a pattern of three axially downwardly extending tabs that are constructed and arranged to fit within relief notches 77a–77c, respectively. Tabs 80a and 80c are illustrated, while tab 80b is hidden from view in FIG. 8. This interfit between upper disk support 46 and upper disk 44 means that these two components, as well as upper disk seal 45, move together as a single unit. The substantially flat upper surface 81 of upper disk support 46 defines a blind receiving recess 82 that is constructed and arranged to provide a support base for spindle 35. Recess 82 includes an enlarged center region 82a and outwardly extending open regions 82b and 82c, oppositely-disposed on opposite sides of the enlarged center region 82a.

Spindle 35 receives drag spring 48 and pivot 47 and this combination (referred to herein as the "friction hinge" 83) creates a part-spherical motion control member that is captured by housing 22 and pinned in position within housing 22 by pivot pin 36. Housing 22 includes a pair of oppositely-disposed pin bores 84, each of which receive a free end of pivot pin 36. Housing 22 fits down over friction hinge 83, allowing control lever portion 34 to extend through center opening 88. With the pivot portion 89 of friction hinge 83 inserted into recess 82 and with the housing 22 positioned, the pivot pin 36 is pushed through one pin bore 84, through a bore aperture in the friction hinge 83, and finally into the opposite pin bore 84. A sliding fit of pivot pin 36 is acceptable since bonnet nut 23 covers both free ends of the pivot pin 36, preventing any noticeable axial movement that might allow the pivot pin to come out of engagement with one of the two pin bores 84. Additionally, a close line-to-line or sliding fit of pivot pin 36 is desired so as to eliminate any backlash or hysteresis in the movement of spindle 35 as it changes direction of rotation about pivot pin 36. Pivot portion 89 has a shape generally coinciding with recess 82, including a larger diameter cylindrical portion 89a bounded by smaller diameter cylindrical portions 89b. All three portions 89a and 89b are coaxial with each other with a common axial centerline.

Washer plate 49 is constructed and arranged to fit up against the undersurface 92 of radial shelf 93 of housing 22. Washer plate 49 is a substantially flat, unitary member that defines a center opening 94 and an alignment notch 95. The washer plate 49 slides down over friction hinge 83 and rests on the upper surface 81 of upper disk support 46. In this manner, the washer plate 49 defines the distance of axial separation between upper disk support 46 and housing 22.

Housing 22 further includes an annular sidewall 98 that defines the hollow interior 99. Sidewall 98 defines a pair of snap-fit openings 100 and an alignment notch 101 in lower edge 102. Radial shelf 93 is generally concentric with annular sidewall 98 and with upper portion 103 that defines center opening 88 and the pair of oppositely-disposed pin bores 84. Opening 88 is shaped and contoured in order to control and limit the range of motion and the available travel directions for the control lever portion 34 of spindle 35. With specific reference to upper portion 103, there is an annular lip or shelf 104 that separates the top 105 from the base 106. Depending on the component part tolerances, the interior annular lip 107 of bonnet nut 23 that is positioned adjacent shelf 104, may actually contact shelf 104 or may be spaced apart from shelf 104 when the bonnet nut 23 is threaded onto collar 26.

Upright arms 57 and 58 of lower housing 41 are each configured with a ratchet-like end 110 that is constructed and arranged to snap into a corresponding one of the two snap-fit openings 100 defined by sidewall 98. The ramped taper of each end 110 allows the corresponding upright arms 57 and 58 to deflect inwardly upon engagement by sidewall 98 until the snap-fit openings 100 are encountered. At this point, the arms 57 and 58 spring outwardly, allowing the undercut of the ramp to engage the lower surface of each opening 100 to thereby create a snap-fit assembly. Alignment notch 101 is constructed and arranged to receive tab 111 of lower body 41. This alignment feature ensures that the two upright arms 57 and 58 will be circumferentially aligned with the two snap-fit openings 100. The axial dimensions and relationships are such that notch-to-tab engagement begins before ends 110 encounter openings 100. As previously noted, if the non-subassembly alternative design is selected, arms 57 and 58 and openings 100 are not required.

Based upon the descriptions of the component parts of FIGS. 7 and 8, it should be clear that everything from the inlet gasket 40 at the bottom to housing 22 at the top can be manually assembled into a single, intact subassembly. Once assembled, with all components interfitting, snapped together, and pinned as described, this subassembly is able to drop down into the hollow interior 24 of body 21. Once in position, the remaining step is to thread the bonnet nut 23 onto collar 26 and tighten the bonnet nut in place.

The construction and subassembly details are further provided by FIGS. 1–6. While the selected cutting planes for the section views will not reveal every structural detail of every component part, FIGS. 7 and 8 make up any deficiencies in this respect. FIGS. 1–6 do clearly illustrate how the component parts are assembled and how they cooperate with each other for the construction of fluid control valve 20.

As discussed in the Background, single-handled control valves are typically constructed and arranged to enable two control functions, the flow rate from a maximum flow to being fully shut off and the desired water temperature. The movement and positioning of upper disk 44, via spindle 35, as well as the specific structure of upper disk 44 causes the three flow passageways, those defined in lower disk 43, lower housing 41, and valve body 21, to be open or closed in varying degrees and thereby dictate the state or condition of the fluid flow. In the context of this description, it will be noted that the three openings in body 21, lower housing 41, and lower disk 43 are all axially aligned such that they cooperate to define the three referenced flow passageways. Further, in describing the control function, it will be noted that when the outlet flow is fully open (i.e., not closed), the flow rate will be maximized. As far as the water temperature, the mix ratio of hot and cold water is controlled by the lateral cross sectional area of the corresponding passageways and the sliding position of upper disk 44 on lower disk 43. Closing off part of the cold water passageway causes a higher water temperature. A lower water temperature can be achieved by opening up the cold water passageway or by closing off a portion of the hot water passageway, or some of both. However, if a full flow rate is desired, opening up the incoming water passageways is preferred. The general functioning of a single-handled fluid control valve in this respect is believed to be well known. What sets the present invention apart from the prior designs is the construction and arrangement of the friction hinge 83, the use of drag spring 48, and the sliding action of upper disk 44 across lower disk 43, noting that the sliding action occurs for both directions of movement. While there are a number of structural features associated with the overall design and construction of fluid control valve 20 that are believed to provide improvements in the fabrication of parts, assembly, and use, the construction and arrangement of drag spring 48 provides a novel and unobvious advance in the control, functioning, and "feel" of the spindle. The sliding action of upper disk 44 relative to lower disk 43 in both directions of movement is also considered to be a novel an unobvious advance in the art.

Considering the friction hinge 83 as comprising spindle 35, drag spring 48, and pivot 47, it will be noted that the spindle 35 and pivot 47 assemble together with the drag spring 48 captured therebetween. More specifically, drag spring 48 is captured by spindle 35 and remains fixed within spindle 35 such that any relative motion of spindle 35 compared to pivot 47 includes corresponding motion of drag spring 48.

Spindle 35 includes the control lever portion 34 and integral therewith, as a unitary structure, ball portion 115 and pivot portion 89. The ball portion 115 defines a center bore 116 and, perpendicular to the center bore axis, a lateral channel 117. Two arc-shaped lips 118 and 119 are located on opposite sides of the bore axis and on opposite sides of the lateral channel 117. The axial centerline extending through cylindrical portions 89a and 89b is substantially parallel to the longitudinal axis of center bore 116. The longitudinal centerline of pivot pin 36 is substantially perpendicular to the axis of center bore 116 and is substantially perpendicular to the axial centerline of portions 89a and 89b. Due to the location of pivot pin 36 relative to the axis of center bore 116, it will be understood that the longitudinal axis of pivot pin 36 is orthogonal to the longitudinal axis of center bore 116 and these orthogonal axes intersect at a point.

Pivot 47 is a unitary structure that includes a part-spherical portion 122, cylindrical post 123, cross arms 124 and a pivot pin bore 125 defined by post 123. Cross arms 124 are each contoured with a curved undersurface 126 for clearance with pivot pin 36. In the assembly of pivot 47 into spindle 35, post 123 fits closely into center bore 116 and cross arms 124 fit into lateral channel 117. The only way to separate these two components is to pull apart the pivot 47 and spindle 35 in a direction along the longitudinal axis of post 123. In the final assembly, this type of movement is prevented by the enclosing and capturing nature of housing 21 (see FIGS. 3–5). The longitudinal axis of post 123 is substantially coincident with the longitudinal axis of center bore 116.

Figure 1:
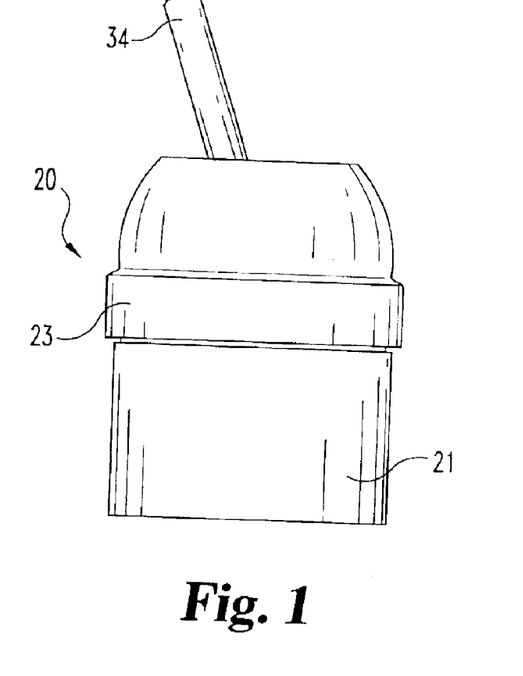
FIG. 1 is a front elevational view of a fluid control valve that includes a friction hinge according to a typical embodiment of the present invention.
Figure 2:
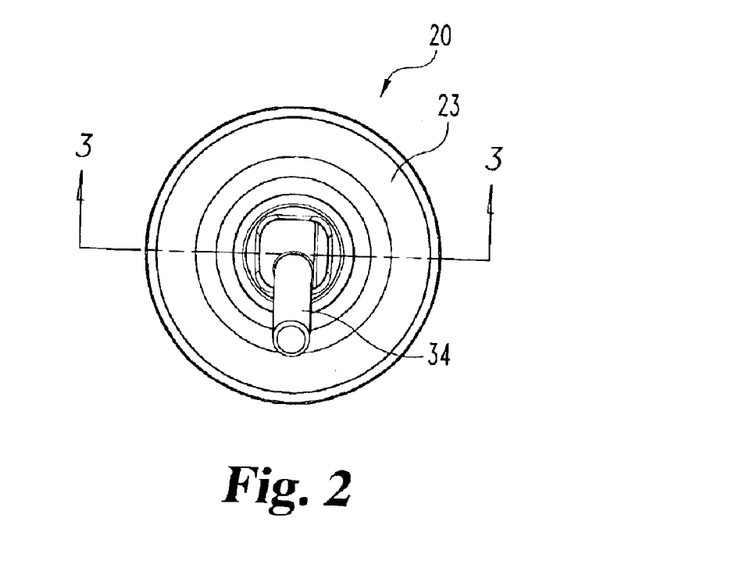
FIG. 2 is a top plan view of the FIG. 1 fluid control valve.
Figure 3:
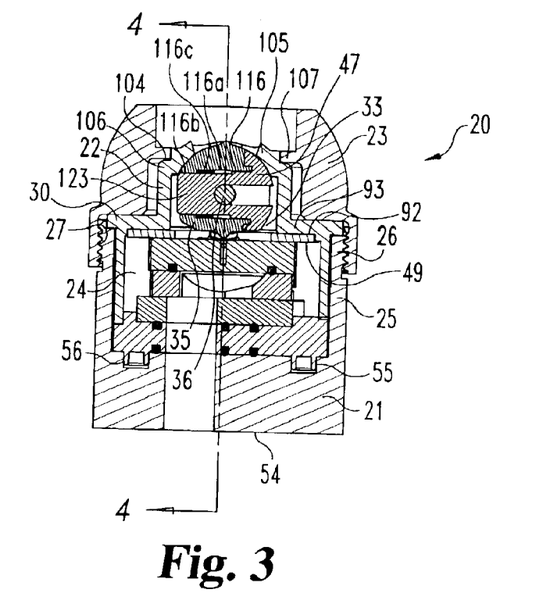
FIG. 3 is a front elevational view, in full section, of the FIG. 1 fluid control valve as viewed along line 3—3 in FIG. 2.
Figure 4:
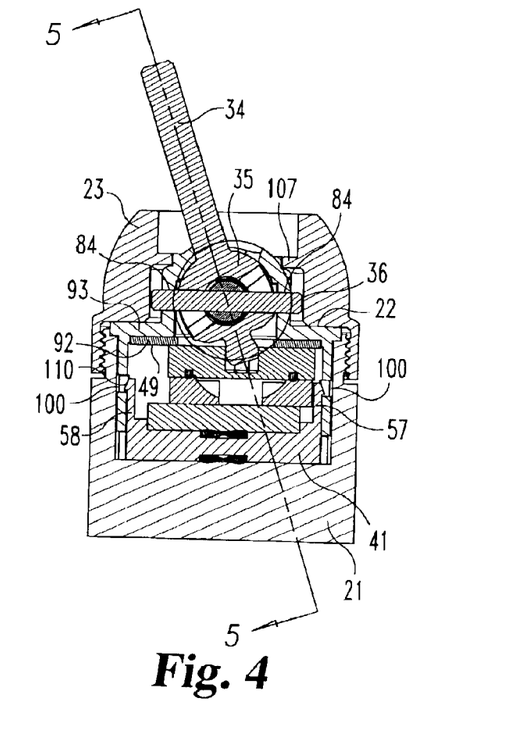
FIG. 4 is a front elevational view, in full section, of the FIG. 1 fluid control valve as viewed along line 4—4 in FIG. 3.
Figure 5:
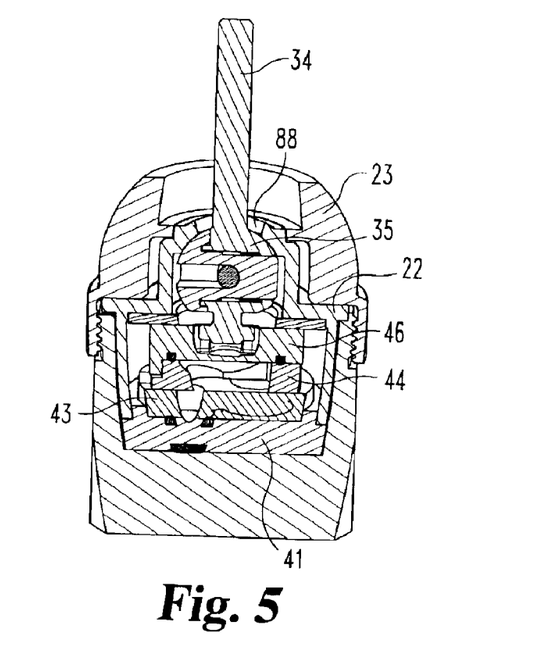
FIG. 5 is a front elevational view, in full section, of the FIG. 1 fluid control valve as viewed along line 5—5 in FIG. 4.
Figure 6:
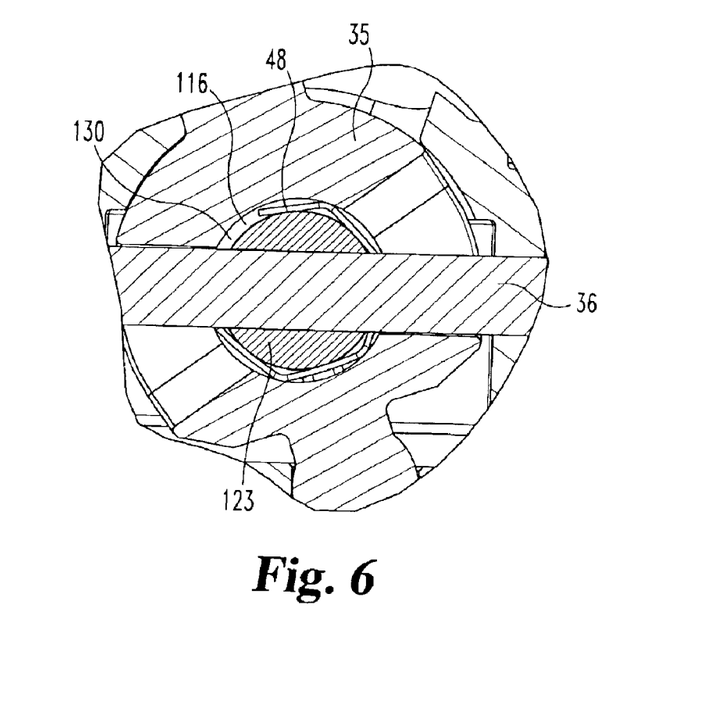
FIG. 6 is an enlarged detail of a portion of the FIG. 1 fluid control valve as illustrated in FIG. 4.

The positioning of drag spring 48 is best illustrated in FIGS. 3 and 4 and additionally by the enlarged detail of FIG. 6. As is illustrated, drag spring 48 is inserted down into the center bore 116 of ball portion 115. The center bore 116 includes a larger diameter first section 116a that is concentric with a smaller diameter section 116b. The interface between sections 116a and 116b defines an annular shoulder 116c. Drag spring 48 seats against shoulder 116c and is positioned between section 116a and cylindrical post 123. Post 123 has a line-to-line fit within section 116b. Pivot pin 36 is inserted at a location that places the pivot pin 36 across the end of drag spring 48, such that the drag spring 48 is positioned between the annular shoulder 116c and pivot pin 36, see FIGS. 3–6.

As would be clear from the assembly of the component parts as illustrated in FIGS. 3, 4, 7, and 8, for example, the control lever portion 34 is movable in a first direction about the axial centerline of cylindrical post 123. Movement of portion 34 in this direction is limited at the travel endpoints by the abutment of the edges of the lateral channel 117 with pivot pin 36. Since the axis of rotation (i.e., the centerline of post 123) is positioned between control lever portion 34 and pivot portion 89, movement of portion 34 results in movement of portion 89 in the opposite direction. This in turn enables the pivot portion 89 to move upper disk support 46 laterally in response to movement of control lever portion 34. As the upper disk portion 46, and in turn upper disk 44, moves with a sliding motion, the flow parameters of the water flowing from the corresponding faucet are changed or adjusted. In this mode of operation, the upper disk support 46 and specifically upper disk 44 moves across the upper surface of lower disk 43 with a sliding action. This lateral sliding motion varies the cross sectional areas of flow openings 43a and 43b. Since these two openings correspond to the hot water and cold water lines, this first direction of movement controls the water temperature.

Since the ends of pivot pin 36 are each received by housing 22, specifically by the pair of pin bores 84, the pivot 47 is fixed in position relative to housing 22 by way of pivot 36 when the control lever portion 34 is moved in the first direction. This enables rotational movement of spindle 35 relative to pivot 47 and positioned at the movement interface is drag spring 48. Unitary drag spring 48 includes a key way tab 129 that is received by a key way notch in spindle 35, specifically in the interior of ball portion 115 adjacent center bore 116. Whatever drag coefficient drag spring 48 creates at the movement interface between spindle 35 and pivot 47 influences the touch or feel of the movement of portion 34 when adjusting or changing the water temperature of the water that is delivered from the corresponding faucet.

The other (second) direction of movement permitted for control lever portion 34 is in a rotational direction about the axial centerline of pivot pin 36. It will be appreciated that the friction hinge 83 is able to rotate as an integral unit about pivot pin 36. Since the axial centerline of pivot pin 36 is located between portion 34 and pivot portion 89, this means that movement of portion 34 in one direction results in movement of pivot portion 89 in the opposite direction. The positioning of pivot portion 89 into recess 82 of upper disk 46 translates movement of control lever portion 34 into sliding movement of upper disk 44 across the upper surface of lower disk 43. Movement of portion 34 in this second direction (i.e., rotational travel about pivot pin 36) is used to adjust the flow rate of the exiting flow of water between a full flow condition and a shut off (no flow) condition. The flow rate is adjusted by the degree that opening 43c is open or closed. "Full" flow is achieved by maximizing the area of opening 43c that is uncovered by upper disk 44. A shut off condition is achieved when upper disk 44 is moved so as to completely cover over openings 43a and 43b.

The two rotational directions of movement for spindle 35, the first about cylindrical post 123 and the second about pivot pin 36, are independent from each other, such that once the desired temperature is selected by movement of spindle 35 about cylindrical post 123, the flow can be adjusted without changing the selected temperature setting. This means that fluid control valve 20 includes a temperature memory capability by enabling water temperature to be independently adjusted relative to the flow rate and by the design of two independent spindle movements.

In the design of fluid control valves of the single-handled or single-lever style having a square pattern of movement (European-style), such as fluid control valve 20, one direction of movement controls the water temperature and another direction of movement, independent from the first, controls the fluid flow rate. As the user of the fluid control valve manually adjusts the water temperature and flow rate, it is possible to inadvertently move the joy stick lever in a direction other than that desired. For example, if the desired temperature has been selected and the flow rate is being adjusted, it is possible to inadvertently move the lever in the temperature direction, thereby changing what had previously been selected as the desired temperature. While this inadvertent change is less likely due to the independent directions of movement, it remains a possibility, particularly in view of the joy stick lever and the fact that it is capable of being moved in the two directions. To the extent that the frictional forces controlling the freedom of movement of the joy stick lever are the same in both directions, then there is no touch or feel while manipulating the joy stick lever that would enable the user to tell when the joy stick lever is moving in an undesired direction. The present invention addresses this issue by the use of drag spring 48.

Drag spring 48 has a generally hex design that is open at one corner. The two free ends are adjacent gap 48a. This gap or opening allows the remainder of the hex body to move and to flex as it is pressed into position in the ball portion 115 around center bore 116 and up against annular shoulder 116c. The press fit of drag spring 48 into center bore 116 causes a slight reduction in the size of the circle or cylinder that is defined by the pattern of tangential (midpoint) contact of each side of the hex design of drag spring 48. Consequently, when the cylindrical post 123 of pivot 47 is inserted into the defined interior opening of drag spring 48, an interference fit is created between the drag spring and the cylindrical post, creating a frictional force along each side of the hex design at its tangential point of contact with the outside diameter of cylindrical post 123.

Drag spring 48 is fabricated as a polygonal sleeve from one of a selection of metal alloys, including phosphor bronze and stainless steel in order to provide a smooth running interface between drag spring 48 and cylindrical post 123. As illustrated, and as has been described, referring now to the enlarged detail of FIG. 6, drag spring 48 is positioned in annular space 130 and is positioned between the inside diameter of center bore 116 of spindle 35 and the outside diameter of cylindrical post 123. While the hex shape is selected as the preferred embodiment for drag spring 48 for the illustrated construction of fluid control valve 20, a range of polygonal shapes are possible, consistent with the theory of operation, depending on the various dimensions. The radial dimension or width of annular clearance space 130 is important and cooperates with the diameter size of post 123 to dictate the number of sides for the preferred polygonal shape of drag spring 48. The ends (corners) of each side (six total) of drag spring 48 are contacted by the inside diameter of bore 116 while the midpoint of each side of drag spring 48 contacts post 123 at a point of tangency. As would be understood from the trigonometry of the relationship between the inside diameter of bore 116 and the outside diameter of post 123, the length of each side of the drag spring 48, the outside diameter of post 123, and the radial width of annular space 130 dictate the number of polygon sides permitted for the drag spring if the described points of contact, ends, and midpoint contact of each side are maintained. As the inside diameter of bore 116 pushes on the ends of each side, i.e., the "corners" of the hex shape, the side is pushed against the outside diameter of post 123. The contact pressure of each hex side against the outside diameter of post 123 creates the drag on spindle 35 as it is moved to adjust the water temperature. The length of each side of the hex shape for drag spring 48 is also a design consideration, since the shorter the length, the "stiffer" the "beam".

The fluid control valve 20 that is created by the structural arrangement of the disclosed component parts provides a device with a European-like square pattern of movement involving two independent axes of rotation. One direction controls the temperature of the water, while the other direction controls the flow rate. Since these rotational axes are independent of one another, valve 20 includes a temperature memory feature. Importantly, rotation of the lever portion about the two axes of rotation translates into sliding movement, in both directions, of upper disk 44 across the upper surface of lower disk 43. This in turn enables a smooth and precise control as part of fluid control valve 20 whether adjusting the water temperature or adjusting the flow rate. The use of drag spring 48 creates a higher frictional force in the temperature control direction and, comparatively, a freer movement in the flow rate direction.

The first embodiment of the present invention is incorporated into a fluid control valve such that the two directions of the motion by the operational handle relate to water flow rate and water temperature. In this specific application, the design of spindle 35, pivot 47, and pivot pin 36 are influenced by the remainder of the control valve structure as well as by the intended function. In the construction of friction hinge 83, only one drag spring 48 is used. In the second embodiment of the present invention, a slightly different friction hinge structure is disclosed.

Referring to FIGS. 9–12, friction hinge 150 includes a spindle 151, pivot 152, pivot pin 153, and a pair of drag springs 154. The spindle 151 includes a socket or gudgeon 155 that defines a through bore 156 for receipt of the pivot or pintle 152. The use of terms such as "gudgeon" and "pintle" are consistent with the description of the motion control device of FIG. 9 as a "friction hinge". The spindle 151 includes a handle 157 or a control arm that is manipulated by the user or by another device for movement in one or the other of the two directions of motion that are enabled by the construction of friction hinge 150. In another embodiment of the present invention, see FIGS. 16 and 17, a drag spring is used for friction control when there is only one axis of rotation.

Continuing with the description of friction hinge 150, the pintle 152 defines a central, lateral bore 158 and cooperating slots 159 are defined by the sidewall of gudgeon 155. As is illustrated, pintle 152 is inserted into through bore 156, with a slip fit, so as to be flush to slightly recessed below the opposite flatted faces 160 and 161 of gudgeon 155. Pivot pin 153 is inserted through one slot 159, into and through bore 158 and through the opposite side slot 159. The pivot pin 153 has sufficient length such that each end extends beyond the corresponding slot defining surfaces of gudgeon 155. These free ends 153a and 153b provide a way to support the remainder of friction hinge 150. Spindle 151 further includes a generally spherical, lower support 162 that is centered relative to gudgeon 155 and is centered on the longitudinal centerline 157a of handle 157. Lower support 162 also serves as a support for the remainder of friction hinge 150.

The wall portion of gudgeon 155 surrounding each slot 159 is raised in order to provide a longer (or wider) surface area of contact between gudgeon 155 and pivot pin 153. The outer end portions 156a and 156b of through bore 156 are each counterbored and define a corresponding annular radial shelf 156c and 156d, respectively. There is a uniform diametral clearance between the outside diameter of pintle 152 and the maximum inside diameter of portions 156a and 156b. What is created by this arrangement is an annular clearance space 163 adjacent each flatted face 160 and 161 and one drag spring 154 is inserted into each clearance space 163.

Figure 12:
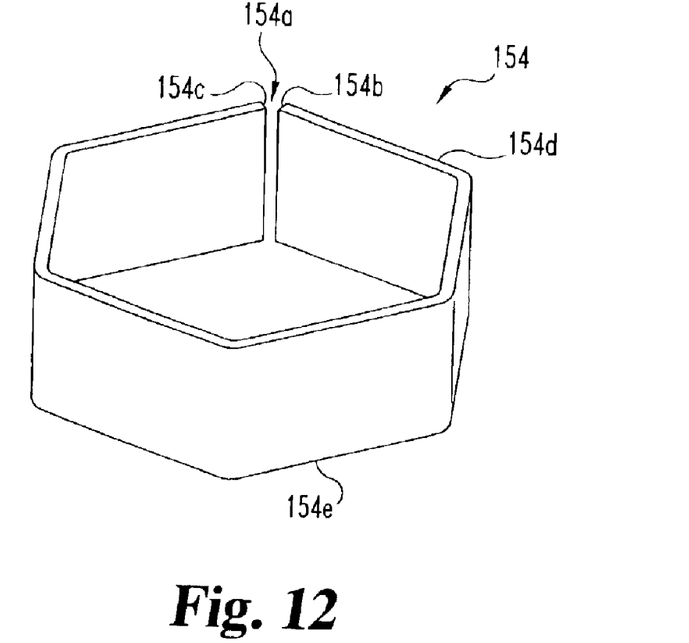
FIG. 12 is a perspective view of a drag spring comprising one component part of the present invention.

Referring to FIG. 12, each drag spring 154 is substantially the same in design and construction as drag spring 48, including the hexagonal sleeve design and the separation gap 154a between the free ends 154b and 154c. A suitable material for the drag springs 154 is stainless steel, and the drag springs 154 are designed to yield on insertion. In this way, the preload at each interface is not entirely dependent on the tolerances of the parts and is therefore more consistent from assembly to assembly.

Consistent with the description of friction hinge 83 and its use as part of the fluid control valve 20, the available directions and range of motion for handle 157 include a first direction of rotary motion about a first axis that corresponds to the longitudinal centerline 152a of pintle 152, limited by the length of slots 159. The second direction of rotary motion is about a second axis that corresponds to the longitudinal centerline 153c of pivot pin 153. The extent of travel in this second direction may also be limited by any surrounding mechanical structure associated with friction hinge 150.

The first axis and the second axis are orthogonal to each other and, in the preferred embodiment, these two axes intersect with one another at a geometric point location that is on the interior of gudgeon 155. However, it should be noted that the two axes can remain orthogonal to each other, consistent with the present invention, without intersecting. For example, the pivot pin configuration and its location relative to the remaining friction hinge assembly could be moved to a lower point and assembled to the spindle and pivot combination and still provide the two directions of motion and the two degrees of freedom with orthogonal axes that do not intersect. It will also be noted that the drag spring of the present invention can be used with a control valve that has a single axis of rotation, such as the control valve of FIGS. 16 and 17.

Friction hinge 83 has been described in the context of a fluid control valve. Friction hinge 150 has been described as a second embodiment of the present invention, whether used as part of a fluid control valve or as part of some other device. As mentioned in the Background, friction hinges 83 and 150, according to the present invention, are suitable for use as part of other devices. Consider for example, a shower head and the desire for it to remain in a selected orientation, even though its weight is acted upon by gravity which might be sufficient, based upon the weight of the shower head, to move it off line from its desired orientation. If, by means of the present invention, the friction force that is set between the movable and stationary components is at a level that exceeds the gravitational pull on the shower head, then the shower head should remain in its selected orientation.

The selectable or adjustable level of frictional "interference" to be created by the friction hinges of the present invention is the result of the dimensions and tolerances for the pintle 152 and bore 156 relative to the dimensions of the drag spring(s) 154 (and the same is true for the corresponding components of friction hinge 83). In addition to the dimensions and tolerances of the pintle 152 and bore 156, it will be seen from the alternative designs and options presented in FIGS. 13–15 that the drag spring itself may include structural features capable of changing the degree of frictional interference. In deciding upon the appropriate level of frictional interference, the weight of the component to be selectively positioned is considered and the manner or nature of any gravitational force acting on that component relative to its selected orientation. In the example of a shower head, if the shower head is pointed in a downward direction, in the direction of gravitational pull, the degree or level of frictional interference could be very moderate in order to prevent any wobble or change of position. However, if the shower head is oriented in more of a cantilever or horizontal position, then the gravitational pull on the head could be substantial and the degree or level of frictional interference would have to be higher. Since the degree or level of frictional interference is set in the assembly at the time of fabrication, a "worst case" design approach needs to be followed.

Consistent with the teachings of the present invention, once the component is manually moved and positioned to the desired orientation, the frictional interference created by the drag spring and its relationship to the surrounding components is intended to hold that component in the selected position. While manual force is required to override the frictional forces and frictional interference initially, once the movable component is positioned, the intent is for it to stay in that position during use.

Figure 13:
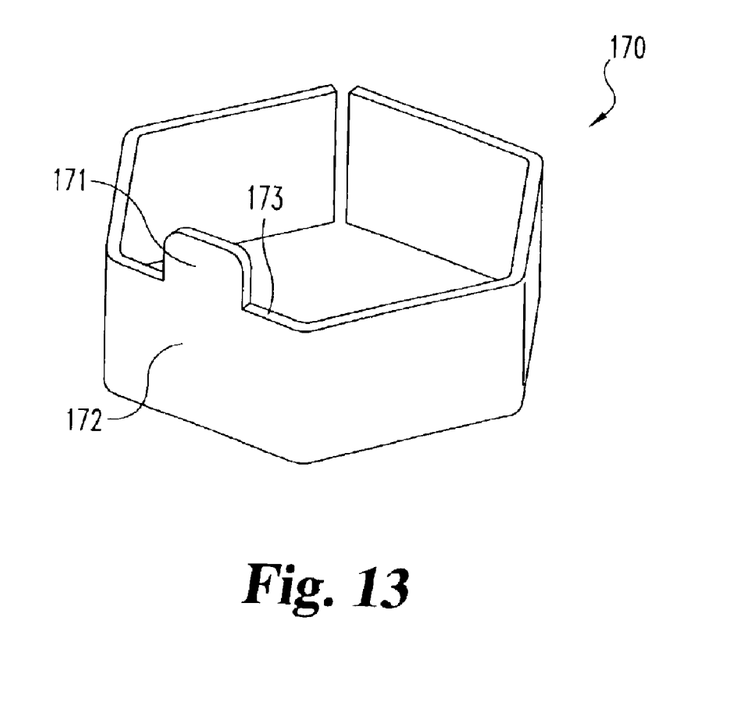
FIG. 13 is a perspective view of another drag spring design suitable for use with the present invention.
Figure 14:
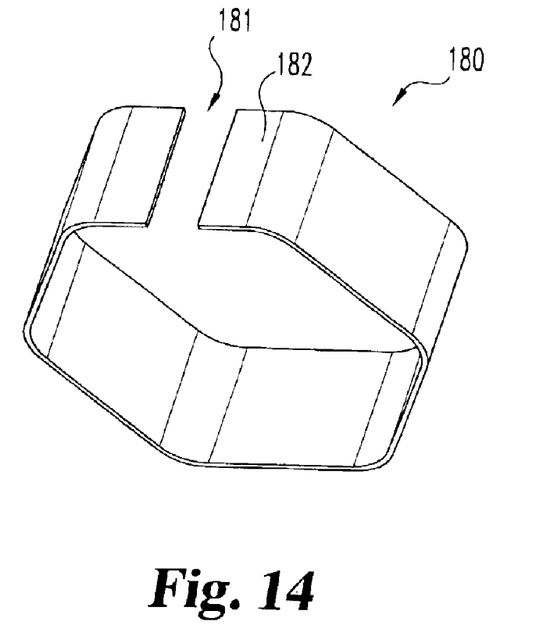
FIG. 14 is a perspective view of yet another drag spring suitable for use with the present invention.
Figure 15:
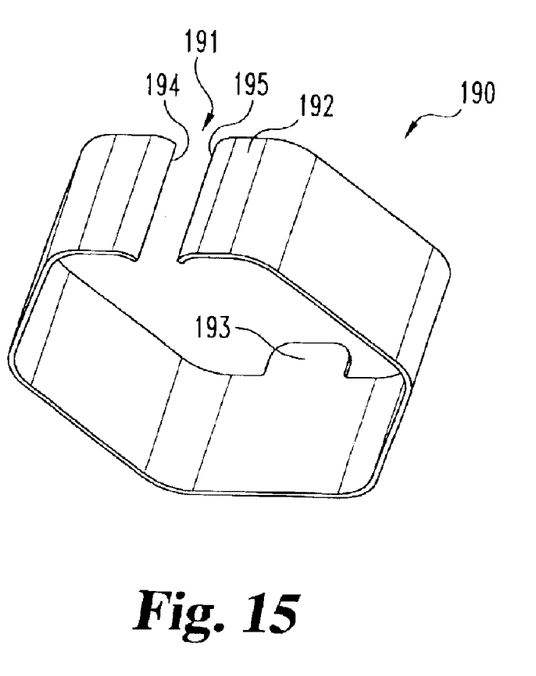
FIG. 15 is a perspective view of yet another drag spring suitable for use with the present invention.

Referring now to FIGS. 13-15, three alternative drag spring designs are illustrated and each would be suitable for use in conjunction with the disclosed embodiments of the present invention. As will be described, various alternatives and options are disclosed and these may or may not be used in combination with others and the number of possible variations will be explained based upon the three that are illustrated.

Considering first the design of drag spring 154 (and 48), see FIG. 12, it will be appreciated that the drag spring has six substantially flat sides and five "corners" with a separation gap 154a generally located at the location of the sixth corner. Free ends 154b and 154c define separation gap 154a. The outer edge surfaces 154d and 154e are substantially flat and parallel to each other. This same basic construction applies to the drag springs illustrated in FIGS. 13–15, with the obvious exceptions due to the relocating of the separation gap and due to the addition of a friction tab.

In the design alternative of FIG. 13, drag spring 170 is structurally identical to drag springs 48 and 154, except for the addition of friction tab 171. Tab 171 is integral with one side 172 of the hex sleeve shape and extends away from free end 173. The use of tab 171 is to increase the frictional force or interference that will be applied to either the pintle or the gudgeon. While friction tab 171 is illustrated as being coplanar with side 172, in actual use friction tab 171 is bent or formed either inwardly or outwardly, as will be described.

In order to increase the frictional force level applied to the pintle, the friction tab 171 is bent inwardly in order to contact the pintle. The degree or extent of tab-to-pintle interference controls the amount or level of added (increased) frictional force. To increase the frictional force level applied to the gudgeon, the friction tab 171 is bent outwardly to contact the gudgeon. The degree or extent of tab-to-gudgeon interference controls the amount or level of added (increased) frictional force.

Referring to FIG. 14, drag spring 180 provides a slightly different concept relative to how the separation gap is incorporated into the design of the drag spring. As described in the context of drag springs 48 and 154, the separation gap is positioned at a "corner" of the hex sleeve structure. This leaves six sides for direct contact with the pintle while applying force on the "ends" of each side by means of the gudgeon. When the separation gap 181 is located in the approximate center of one of the sides of the hex sleeve shape for drag spring 180, such as side 182, this eliminates that side as one of the six that would typically apply a frictional load or frictional interference against the surface of the pintle. By locating the separation gap 181 in this manner (i.e., in a side as opposed to at a corner), the overall frictional force that could be created with six sides in contact is reduced by one sixth.

The drag spring 190 of FIG. 15 is a combination of drag spring 180 and drag spring 170, with one further option illustrated. Drag spring 190 includes a separation gap 191 that is centered in side 192 similar to drag spring 180. Additionally, drag spring 190 includes friction tab 193, similar in construction and use to friction tab 171.

The one further option is to bend the free ends 194 and 195 either inwardly as illustrated or outwardly. By bending or turning the free ends 194 and 195 outwardly, contact is made with the bore of the gudgeon. By bending or turning the free ends 194 and 195 inwardly, contact is made with the pintle or shaft of an assembly. This "contact" increases the level of friction between the drag spring 190 and the corresponding component being contacted by free ends 194 and 195.

While the locating of the separation gap in the center of a side (see FIGS. 14 and 15) effectively eliminates that side from adding or contributing frictional contact to the assembly, the use of tab 193 (bent inwardly or outwardly) and/or the use of the free ends 194 and 195 (bent inwardly or outwardly) will add additional frictional contact or interference to the assembly. What has been illustrated and described for the drag spring of the present invention is a variety of structural features and options including where the separation gap is located, specifically either at a corner or in a side, the addition of a friction tab that may be bent inwardly or outwardly in order to increase the frictional level present in the assembly, and the option of bending the free ends of the separation gap, either inwardly or outwardly, to increase the level of friction for the overall assembly.

Figure 16:
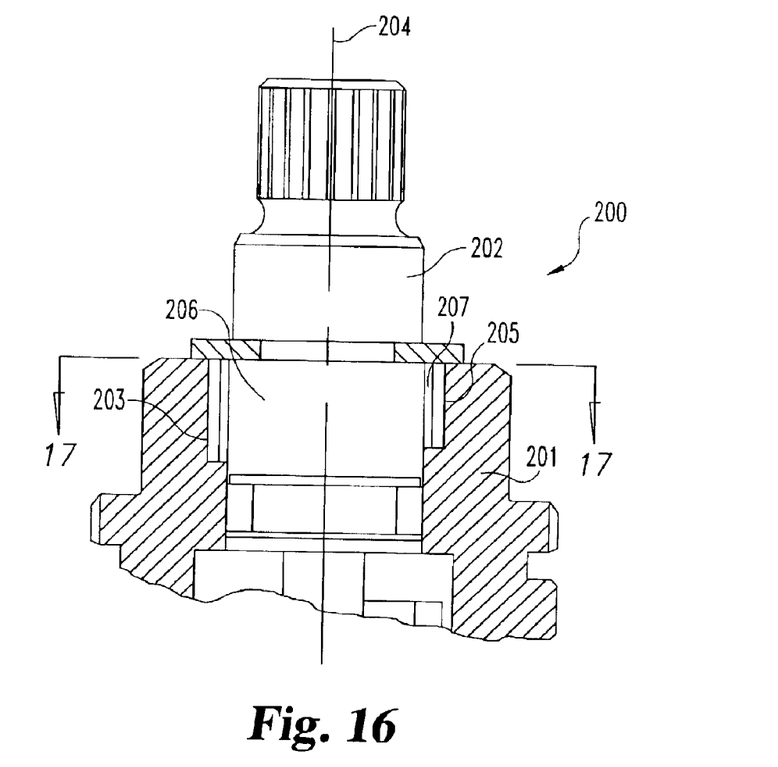
FIG. 16 is a partial, front elevational view, in full section, of a single axis control valve incorporating a drag spring according to the present invention.
Figure 17:
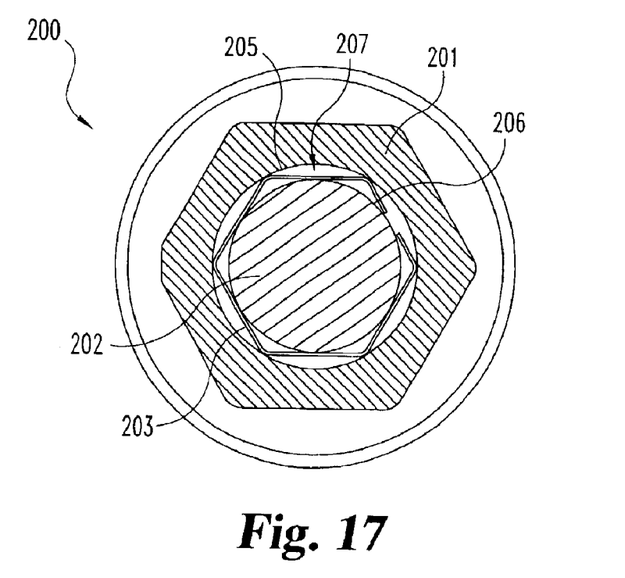
FIG. 17 is a top plan view of the FIG. 16 control valve as viewed along line 17—17 in FIG. 16.

Referring to FIGS. 16 and 17, there is illustrated a control valve 200 that includes a stationary, annular body 201, a generally cylindrical, rotatable shaft 202, and a drag spring 203 all according to the present invention. Control valve 200 is intended to be representative of a further use for the present invention, in this case a device having a single axis of rotation (shaft 202 relative to body 201) as represented by axis 204. The use of drag spring 203 in this context is for the purposes of motion control. An example of use for control valve 200 is as a head valve as would be provided for two handle faucets with separate HOT and COLD valves.

Drag spring 203 is constructed and arranged substantially the same as drag springs 48 and/or 154. Additionally, the illustrated and described use for drag spring 203, as part of control valve 200, is compatible with the alternatives and design options of FIGS. 13–15 as represented by drag springs 170, 180, and 190. More specifically, while the basic design for drag spring 203 is substantially the same as that illustrated in FIG. 12, drag spring 203 can include a friction tab as one option and can have its separation gap positioned in a hex side as another option. The friction tab can be bent inwardly or outwardly and the free ends of the hex sleeve (drag spring) can be bent inwardly or outwardly as still further options for the drag spring design.

Annular body 201 defines a cylindrical bore portion 205 and cylindrical surface 206 of shaft 202 is concentric with portion 205. The radial separation between portions 205 and 206 defines an annular clearance space 207 that receives drag spring 203. Even though control valve 200 may be used in the context of a fluid control device, such as HOT and COLD handles for a water faucet, the actual use of drag spring 203 is for the purposes of motion control. There is an interference fit of drag spring 203 into clearance space 207, consistent with what has been described for drag springs 48 and 154 and what would be applicable to drag springs 170, 180, and 190.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A motion control device for controlling the movement of an operational member about a first axis and about a second axis, said motion control device comprising:
   a spindle including a socket and a control arm, said socket defining a first axis opening;
   a pivot member inserted into said first axis opening such that said pivot member is concentric with said first axis, said pivot member defining a second axis opening, said first axis opening surrounding one end of said pivot member and defining therewith an annular clearance space adjacent said one end;
   a pivot pin inserted into said second axis opening such that said pivot pin is concentric with said second axis, wherein said spindle is constructed and arranged to pivot in a first direction about said first axis and in a second direction about said second axis, wherein said first and second axes are orthogonal to each other; and
   a drag spring positioned in said annular clearance space adjacent said one end.

2. The motion control device of claim 1 wherein said first axis opening surrounds an opposite end of said pivot member and defining therewith an annular clearance space adjacent said opposite end.

3. The motion control device of claim 1 wherein said socket defines a first pivot pin slot on one side of said pivot member and a second pivot pin slot on an opposite side of said pivot member.

4. The motion control device of claim 3 wherein said pivot pin having one end extending outwardly from said first pivot pin slot and an opposite end extending outwardly from said second pivot pin slot.

5. The motion control device of claim 1 wherein said first and second orthogonal axes intersect at a geometric point location.

6. The motion control device of claim 5 wherein said geometric point location is within said socket.

7. The motion control device of claim 6 wherein said first axis opening surrounds an opposite end of said pivot member and defining therewith an annular clearance space adjacent said opposite end.

8. The motion control device of claim 7 wherein said socket defines a first pivot pin slot on one side of said pivot member and a second pivot pin slot on an opposite side of said pivot member.

9. The motion control device of claim 8 wherein said pivot pin having one end extending outwardly from said first pivot pin slot and an opposite end extending outwardly from said second pivot pin slot.

10. The motion control device of claim 9 wherein said spindle further including a lower support member.

11. A motion control device for controlling the movement of an operational member about a first axis and about a second axis, said motion control device comprising:
    a spindle including a socket and a control arm, said socket defining a first axis opening;
    a pivot member inserted into said first axis opening such that said pivot member is concentric with said first axis, said first axis opening surrounding one end of said pivot member and defining therewith an annular clearance space adjacent said one end;
    a support member assembled to the assembly of said spindle and said pivot member, said support member being positioned concentric with said second axis, wherein said spindle is constructed and arranged to pivot in a first direction about said first axis and in a second direction about said second axis, wherein said first and second axes are orthogonal to each other; and
    a drag spring positioned in said annular clearance space adjacent said one end.

12. The motion control device of claim 11 wherein said first axis opening surrounds an opposite end of said pivot member and defining therewith an annular clearance space adjacent said opposite end.

13. A motion control device for controlling the rotation of an operational member about a first axis, said motion control device comprising:
    a housing member defining an interior bore:
    a rotatable shaft member positioned in said interior bore and including a control surface, said control surface and said interior bore defining an annular clearance space therebetween; and
    a drag spring positioned in said annular clearance space in contact with said control surface for increasing the level of friction on said rotatable shaft member.

14. The motion control device of claim 13 wherein said drag spring is constructed and arranged with a hex sleeve shape including a separation gap defined by two free ends.

15. The motion control device of claim 14 wherein said drag spring includes a bendable friction tab.

16. The motion control device of claim 14 wherein the separation gap of said drag spring is positioned at a corner of the hex sleeve shape.

17. The motion control device of claim 14 wherein the separation gap of said drag spring is positioned in a hex side of said hex sleeve shape.

18. The motion control device of claim 17 wherein each free end is bendable inwardly for increasing friction against said rotatable shaft.

19. A motion control device for controlling the rotation of an operational member about a first axis, said motion control device comprising:
    a housing member defining an interior bore:
    a rotatable shaft member positioned in said housing member and including a control surface, said control surface and said interior bore defining a clearance space therebetween; and
    a hex sleeve-shaped drag spring positioned in said clearance space for increasing the level of friction on said rotatable shaft member.

* * * * *